US011459889B2

(12) United States Patent
Michon et al.

(10) Patent No.: US 11,459,889 B2
(45) Date of Patent: Oct. 4, 2022

(54) HYDRAULIC ARRANGEMENT FOR A STEERED WHEEL OF A VEHICLE

(71) Applicant: POCLAIN HYDRAULICS INDUSTRIE, Verberie (FR)

(72) Inventors: Sylvain Michon, Verberie (FR); Roman Predny, Verberie (FR)

(*) Notice: Subject to any disclaimer, the term of this patent is extended or adjusted under 35 U.S.C. 154(b) by 0 days.

(21) Appl. No.: 17/047,734

(22) PCT Filed: Apr. 25, 2019

(86) PCT No.: PCT/FR2019/050971
§ 371 (c)(1),
(2) Date: Oct. 15, 2020

(87) PCT Pub. No.: WO2019/207252
PCT Pub. Date: Oct. 31, 2019

(65) Prior Publication Data
US 2021/0108608 A1    Apr. 15, 2021

(30) Foreign Application Priority Data
Apr. 25, 2018 (FR) .................... 18 53625

(51) Int. Cl.
*F01C 1/04* (2006.01)
*B60K 7/00* (2006.01)
(Continued)

(52) U.S. Cl.
CPC ............ *F01C 1/045* (2013.01); *B60K 7/0015* (2013.01); *F03C 1/047* (2013.01); *F03C 1/0435* (2013.01);
(Continued)

(58) Field of Classification Search
CPC ...... F01C 1/045; F01C 1/0435; F01C 1/0438; F01C 1/0441; B60K 7/0015; B60K 2007/0038
See application file for complete search history.

(56) References Cited

U.S. PATENT DOCUMENTS 9,393,860 B2 *   7/2016   Vidal .................. B60K 7/0015
9,404,485 B2 *   8/2016   Houillon ............... F03C 1/0678
(Continued)

FOREIGN PATENT DOCUMENTS

EP    3269994 A1    1/2018
FR    2693154 A1    1/1994
(Continued)

OTHER PUBLICATIONS

English language counterpart of FR 2693154, Jan. 7, 1994.

*Primary Examiner* — Abiy Teka
(74) *Attorney, Agent, or Firm* — Robert Facey

(57) ABSTRACT

The arrangement comprises a hydraulic machine with at least two operating cylinders, the hydraulic machine comprising a rotor part configured to be connected to the steered wheel and a stator part having main enclosures open in a receiving interface, and a pivot device that defines a pivot axis of the stator part and has main outer orifices linked to the main enclosures of the hydraulic machine in a connection interface. The arrangement further comprises a pilot line linked to a pilot chamber which has a pilot inlet in the receiving interface and the pilot line is formed in the pivot device and extends between an outer pilot orifice present in this device and a pilot opening located in the connection interface.

22 Claims, 4 Drawing Sheets

(51) Int. Cl.
*F03C 1/34* (2006.01)
*F03C 1/40* (2006.01)
*F03C 1/047* (2006.01)
*F03C 1/053* (2006.01)

(52) U.S. Cl.
CPC ............ *F03C 1/0447* (2013.01); *F03C 1/053* (2013.01); *B60K 2007/0038* (2013.01)

(56) References Cited

U.S. PATENT DOCUMENTS

| | | | |
|---|---|---|---|
| 2016/0032908 A1* | 2/2016 | Viard | F04B 1/0439 91/491 |
| 2017/0130693 A1 | 5/2017 | Costaz et al. | |
| 2018/0017117 A1 | 1/2018 | Engrand et al. | |

FOREIGN PATENT DOCUMENTS

| | | |
|---|---|---|
| FR | 3043433 A1 | 5/2017 |
| GB | 2269207 A | 2/1994 |

\* cited by examiner

HYDRAULIC ARRANGEMENT FOR A STEERED WHEEL OF A VEHICLE

This present disclosure relates to a hydraulic arrangement for a steered wheel of a vehicle, comprising:
- a hydraulic machine which comprises a rotor part configured to be connected to the steered wheel, a stator part which has two main enclosures having respective main openings located in a receiving interface, a set of pistons sliding in cylinders to drive in rotation the rotor part, a fluid distributor configured to establish selective links between the main enclosures and the cylinders,
- a pivot device which defines a pivot axis of the stator, which has two main outer orifices linked to respective connection openings located in a connection interface and which is configured to be fixed to a support by being linked to the stator of the hydraulic machine so that the receiving and connection interfaces cooperate by linking the respective main openings and the respective connection openings.

An arrangement of this type is known from patent FR 2 693 154.

This patent describes a motor arrangement for a hydraulic drive wheel of a vehicle, in which the pivot device includes a rotating joint device interposed between the hydraulic machine (in this case a hydraulic motor) to which the wheel is coupled and the support, for example the frame of a vehicle. Thanks to this rotating joint, the main outer orifices of the pivot device are fixed in rotation, and the lines that are connected thereto are therefore not affected by the rotation of the motor about the pivot axis of the stator. This concerns the main orifices necessary for the operation of the machine, particularly the hydraulic fluid supply and exhaust.

It is also known that a hydraulic machine can comprise one or several component(s) requiring a hydraulic piloting. Such a component can for example be a displacement selector or a brake or brake release member or in general, any component to be moved by piloting between at least two positions having an influence on the operating mode of the machine. For example, the machine may include two operating displacements, or even more. To this end, one or several control fittings of a displacement selector can be provided. The displacement selector can particularly be a solenoid valve, electrically piloted by electrical fittings. The displacement selector may alternatively be a hydraulic selector, in which case the fittings are hydraulic piloting fittings.

Conventionally, the displacement selector is provided inside the hydraulic machine, and therefore pivots therewith about the pivot axis of the stator. Thus, the selection fittings of the displacement, whether they are hydraulic or electric, are hoses that accompany this pivoting. However, such hoses can be weakened and can be damaged during the use of the machine or of the vehicle equipped with the steered wheel, particularly when it is a construction machine or an agricultural vehicle.

The same problem arises with a component other than a displacement selector, for example a brake or brake release member such as a piston, a disc or a dog.

The present disclosure aims at overcoming at least substantially the aforementioned drawbacks.

Thus, the disclosure relates to a hydraulic arrangement for a steered wheel of a vehicle, comprising:
- a hydraulic machine which comprises a rotor part configured to be connected to the steered wheel, a stator part which has two main enclosures having respective main openings located in a receiving interface, a set of pistons sliding in cylinders to drive in rotation the rotor part, and a fluid distributor configured to establish selective links between the main enclosures and the cylinders,
- a pivot device which defines a pivot axis of the stator, which has two main outer orifices linked to respective connection openings located in a connection interface and which is configured to be fixed to a support by being linked to the stator of the hydraulic machine so that the receiving and connection interfaces cooperate by linking the respective main openings and the respective connection openings, and
- a pilot line linked to a pilot chamber,
in which device the pilot chamber has a pilot inlet located in the receiving interface and the pilot line is formed in the pivot device and extends between an outer pilot orifice present in the pivot device and a pilot opening located in the connection interface, the pilot opening being linked to the pilot inlet by the cooperation of the connection and receiving interfaces.

According to the present disclosure, the pilot line is formed in the pivot device and therefore may not be damaged due to the environment external to the device. The pilot control is transmitted to the displacement selector through the cooperation of the connection interface and of the receiving interface. The outer pilot fitting is linked to the outer pilot orifice present in the pivot device, that is to say it is located in a static part with respect to the pivoting about the pivot axis. As indicated, the pilot line and the pilot chamber can be used to pilot a hydraulic component, particularly a displacement selector or a brake or brake release member.

Optionally, the machine comprises a displacement selector able to be controlled via the pilot chamber between at least two different displacement configurations in which the links established by the fluid distributor differ.

In this case, the component on which the piloting acts is a displacement selector. However, this component may be different, for example a brake or brake release member. Several components, each having its respective piloting, made by a dedicated pilot line and a dedicated pilot chamber, made according to the present disclosure, can coexist.

Optionally, the pivot device comprises a casing which has the main outer orifices and the pilot orifice and a core, which is disposed in the casing, the casing and the core cooperating to define respective linking ducts between the main outer orifices and the connection openings.

The casing and the core can be static with respect to the pivoting about the pivot axis of the stator. The core can be fitted into an outer cavity of the casing, the core and the casing being suitably configured to define the respective linking ducts therebetween.

For example, the linking ducts can be concentric and parallel to the pivot axis of the stator.

This allows producing these ducts with sufficiently large fluid passage sections for the circulation of the supply and exhaust fluid of the hydraulic machine, while adopting a simple and compact configuration.

Optionally, the pilot line is formed in the wall of the casing and the pilot opening is located in a surface of said casing in the connection interface.

As regards the piloting of a component of the aforementioned type, the pilot line may have only a small section, insofar as the pilot pressure can be relatively reduced. Thus, it is possible to benefit from the thickness of the wall of the casing in order to produce this line by drilling, while maintaining a generally symmetrical geometry about the pivot axis of the stator, for the core.

Optionally, the pilot line is formed in a part of the core.

As indicated, the casing and the core can cooperate to define linking ducts and these can optionally be concentric. In particular, the core can comprise a set of concentric tubes, in which case the linking ducts can be formed between the tubes or in the innermost tube. For example, an inner tube of small section can be added inside the innermost linking duct in order to add the pilot line thereinside, while keeping in this linking duct an adequate passage section. The pilot line can also be provided inside or, respectively, outside another tube of the core, whose thickness may be small. In this case, the pilot line comprises the radial space arranged between the inner, or respectively outer, periphery of this other tube and the element (tube or wall of the casing) adjacent thereto.

Optionally, the pilot opening is located in a groove, extending along at least one ring portion and located in the connection interface.

This groove can particularly extend over an angular range corresponding to the angular travel of the pivoting of the hydraulic machine relative to the pivot device, so as to allow, with a simple configuration, that whatever the angular position of the hydraulic machine relative to the pivot device in the provided range of travel, the pilot opening is linked to this groove.

Optionally, the pilot inlet is located in a staging of the receiving interface.

Optionally, the pilot chamber is linked to the pilot inlet by a linking pilot line arranged in the stator.

Optionally, the pilot line comprises an axial segment substantially parallel to the pivot axis of the stator, said axial segment being optionally formed by a drilled hole plugged at its end opposite to the connection interface by an added plug.

Optionally, the displacement selector comprises a spool movable in a bore of the stator part, with which the pilot chamber communicates, this spool being configured to be moved in a first direction when the pressure in the pilot chamber increases against a return means, urging the spool in the opposite direction.

Optionally, the spool is disposed in the fluid distributor and, optionally, the axis of translation of the spool coincides with the axis of rotation of the rotor part of the hydraulic machine.

Optionally, the spool is disposed in a casing part of the hydraulic machine, particularly a part ("distribution cover") which at least partially surrounds the distributor.

Optionally, the pivot device comprises at least one additional outer orifice linked to an additional opening located in the connection interface to be connected to an additional opening of the hydraulic machine located in the receiving interface.

Optionally, the hydraulic machine is a radial-piston and multilobe cam hydraulic machine.

The pilot line can have a simple geometry, for example produced by machining. The displacement selector can be produced in a small space requirement, and be controlled reliably from a fitting linked to the pivot device at the outer pilot orifice.

The disclosure will be well understood and its advantages will become more apparent upon reading the following detailed description of embodiments represented by way of non-limiting examples. The description refers to the appended drawings in which.

Figure 1:
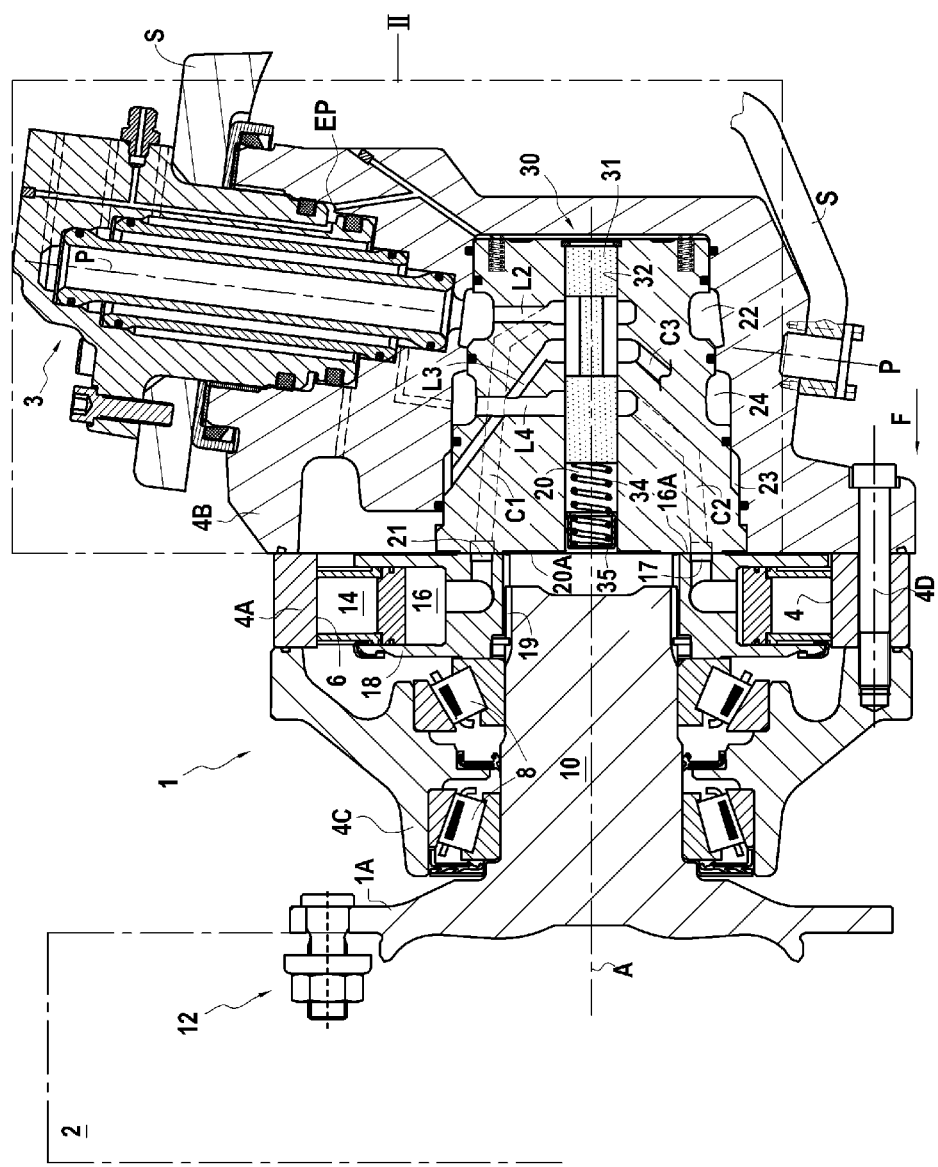
FIG. 1 is a general view in axial cross-section of a hydraulic arrangement according to the present disclosure.

The arrangement represented in FIG. 1 comprises a hydraulic machine 1 whose outlet 1A is rotatable about an axis of rotation A. A steered wheel 2 can be coupled to this outlet 1A. The arrangement also comprises a pivot device 3 which defines a pivot axis P of the hydraulic machine. This pivot device 3 is fixed to a support S, such as part of the frame or chassis of a vehicle.

In this case, the hydraulic machine is of the type with radial pistons and multilobe cam. The machine is particularly a hydraulic motor. In this case, it comprises a fixed casing comprising an intermediate part 4A on the inner periphery of which the multilobe cam 6 is formed, an end part 4B forming a distribution cover with which the pivot device 3 cooperates, and another end part 4C, located on the opposite side of the intermediate part 4A, whose inner periphery cooperates with bearings 8 to support the rotation of a rotary shaft 10 whose end opposite to the casing forms a flange for fixation, for example with nuts 12, to the steered wheel, this flange forming the outlet 1A of the machine. The parts 4A, 4B and 4C are fixed together with screws 4D. In this case, the support S comprises two branches on each of which a respective part of the pivot device is fixed, these parts being aligned with the pivot axis P and a casing part of the machine (in this case the distribution cover 4B) being mounted between the two respective parts of the pivot device.

The machine comprises a set of pistons 14, which in this case are oriented radially and which slide in cylinders 16 formed in a cylinder block 18. The cylinders and the pistons are oriented radially with respect to the axis of rotation A of the rotor. The machine further comprises an inner hydraulic fluid distributor 20 which is located in the part 4B of the casing.

Between the distribution cover 4B and the distributor 20 are arranged main enclosures 22, 24 used respectively for the supply and exhaust of the hydraulic fluid. Conventionally, the distributor 20 has distribution orifices 21 located in a radial distribution face 20A able to communicate with communication orifices 17 of the cylinder block 18 located in a radial communication face 16A of this cylinder block against which the distribution face 21 bear, for example by means of springs. The distribution orifices 21 are linked to either of the main enclosures 22 and 24 by the distributor 20, so that the communication between the distribution orifices 21 and the communication orifices 17 puts the cylinders in communication with either of the main enclosures 22 and 24.

In the example represented, the stator of the hydraulic machine comprises the casing 4A, 4B, 4C and the inner fluid distributor 20, while the rotor comprises the shaft 10 and the cylinder block 18, to which the shaft is coupled by splines or the like 19.

The inner fluid distributor 20 comprises, in a manner known per se, distribution ducts establishing links between the main enclosures 22 and 24 and the distribution orifices. In this case, the hydraulic machine is of the type with two distinct operating displacements and the distribution ducts are divided into three groups, namely:

a first group of ducts C1 permanently linking the first main enclosure 22 to a first series of distribution orifices, a second group of ducts C2 permanently linking the second main enclosure 24 to a second series of distribution orifices, and a third group of ducts C3 which, according to the retained displacement configuration, are linked to the first or to the second group.

In this case, an additional enclosure 23 is arranged between the distribution cover 4B and the distributor 20. The distribution ducts of the third group are permanently linked to this intermediate enclosure 23.

Figure 2:
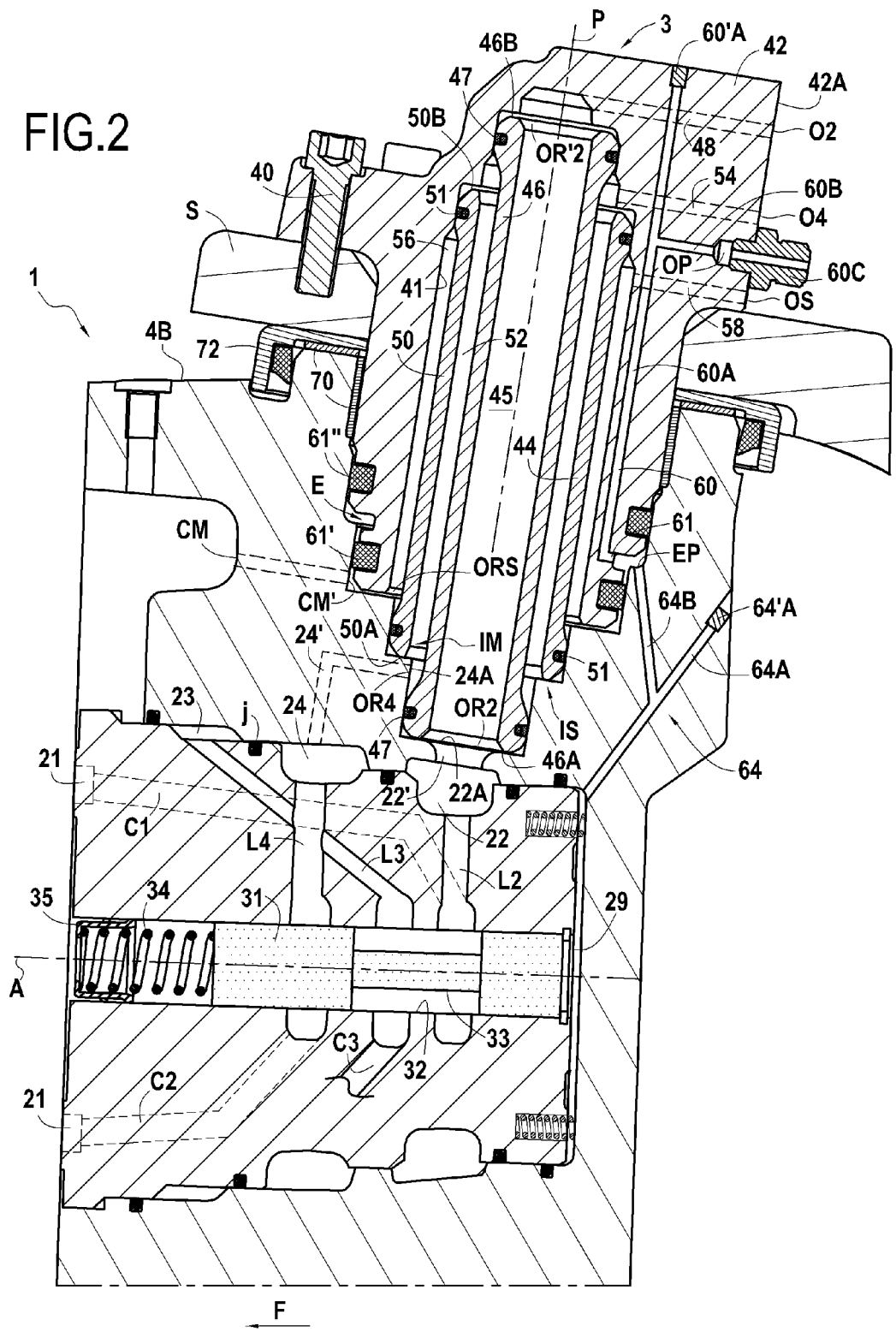
FIG. 2 is an enlarged view of the part II of FIG. 1.

The machine comprises a displacement selector 30 which comprises in this case a spool 31, movable in translation between a first position in which it communicates the enclosures 22 and 23, as represented in FIGS. 1 and 2, and a second position in which it communicates the enclosures 24 and 23. In this case, the spool 31 is disposed in a bore 32 with an axis parallel to the axis A of rotation of the rotor of the machine and even coincident with this axis. The spool has a groove 33 on its outer periphery, and the enclosures 22, 23 and 24 are linked to the bore by linking drills, respectively L2, L3 and L4 which open into successive axial slices of the bore 32. In the position represented in FIGS. 1 and 2, the groove 33 communicates the linking ducts L2 and L3. The spool is held in this position by a return spring 34 bearing on an end abutment of the bore 32, for example materialized by a drilled plug 35.

The spool 31 can be moved in the opposite direction, against the return force exerted by the spring 34 by the fluid supply of a hydraulic piloting chamber 29.

In this case, the fluid supply of this pilot chamber 29 tends to push the spool 31 back in the direction F indicated in FIG. 2, to compress the spring 34 and thus communicate the ducts L3 and L4.

Of course, what has just been described is only an example of a displacement selector. Particularly, it is not necessary for the bore of the selector to be centered on the A axis.

Figure 3:
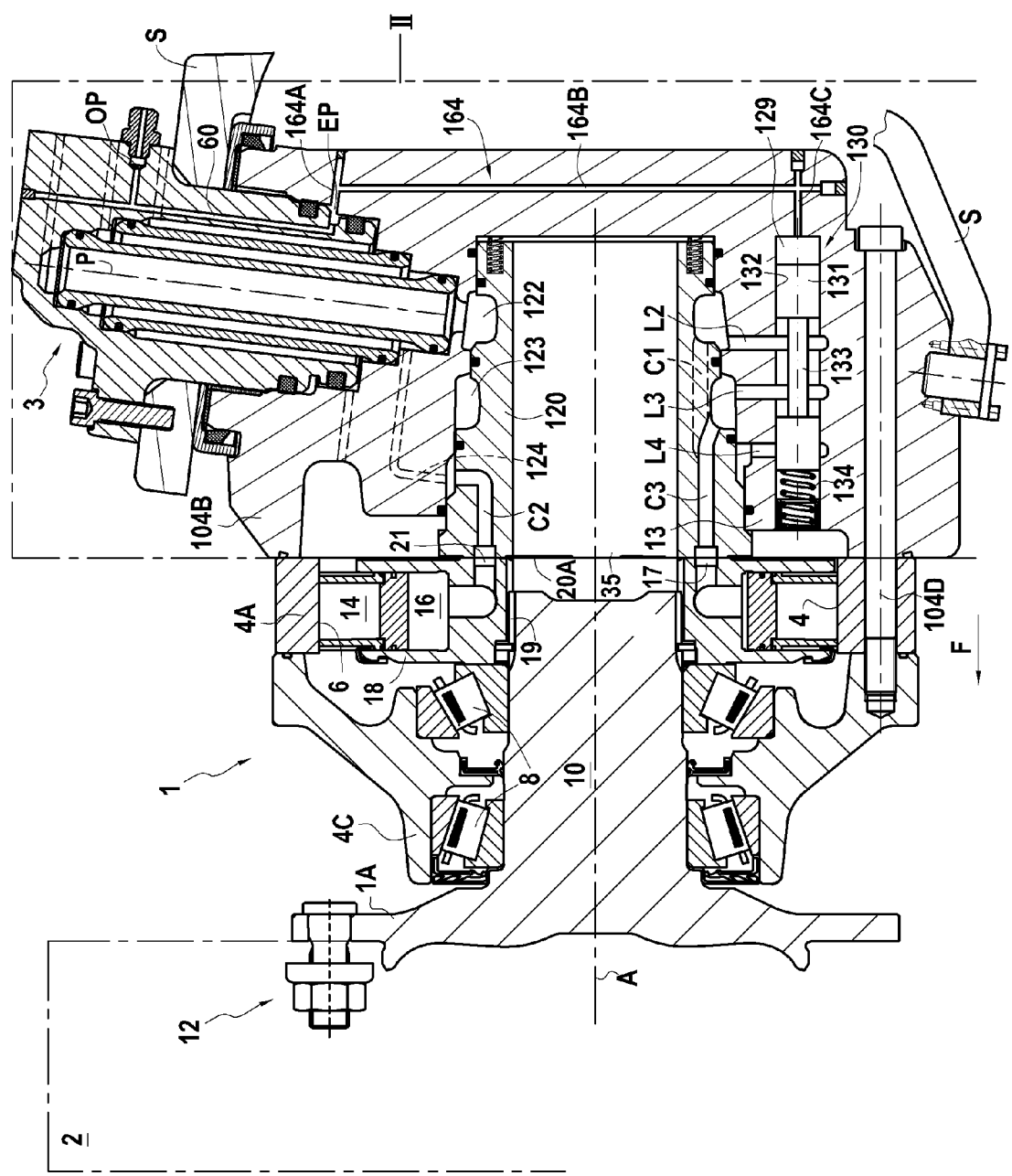
FIG. 3 is a view similar to FIG. 1, showing a variant.

Thus, the displacement selector 130 in FIG. 3 is disposed differently. In this figure, the elements unchanged compared to FIG. 1 are designated by the same references, while the elements corresponding to those in FIG. 1 but modified are designated by references increased by 100. The distribution cover 104B, fixed to the casing parts 4A and 4C with screws 104D, is configured to receive the displacement selector 130 outside the inner distributor 120.

The first, second and third groups C1, C2 and C3 of distribution ducts are respectively permanently linked to the enclosures 122, 123 and 124.

The displacement selector 130 comprises a spool 131, movable in translation between a first position in which it communicates the enclosures 122 and 123, as represented in FIG. 3, and a second position in which it communicates the enclosures 124 and 123. The spool 131 is disposed in a bore 132 and has a groove 133 on its outer periphery. The enclosures 122, 123 and 124 are linked to the bore 132 by the connection drills L2, L3 and L4, respectively. In the position represented in FIG. 3, the groove 133 communicates the linking ducts L2 and L3. The spool is held in this position by the spring 134.

The spool 131 can be moved in the direction F against the return force exerted by the spring 134, by the fluid supply of the hydraulic piloting chamber 129.

In the example described, the distributor comprises three series of distribution ducts. For example, the first main enclosure 22 or 122 is used for the fluid supply while the second main enclosure 24 or 124 is used for the exhaust. Thus, the sum of the number of distribution ducts of the first and third groups C1 and C3 corresponds to the number of distribution ducts of the second group C2. Other situations could of course be provided, for example situations with four groups of distribution ducts corresponding in pairs to supply and exhaust ducts in a large displacement situation. Different displacement selectors can also be provided, for example of the type described in the French patent applications No FR 3 043 147 or FR 3 043 433, in particular to have safety functions and/or to have more than two displacements.

In the example represented and described in the present disclosure, the displacement selector is of the hydraulically controlled type, that is to say comprising a hydraulic piloting chamber which can be supplied with pilot fluid in order to urge the selector between its different configurations to operate the hydraulic machine in different displacements. Thus, the arrangement according to the present disclosure comprises a pilot line and a pilot chamber. Although, in the example represented, this line and this chamber are used to pilot a displacement selector, they could be used to pilot another hydraulic component, particularly a brake or brake release member.

FIG. 2 now focuses on the pivot device 3 and on its connection with the hydraulic machine. This description also applies to the variant of FIG. 3. The pivot device 3 is fixed to the support S, for example with screws 40. This device defines a pivot axis P for the hydraulic machine and furthermore performs hydraulic connections for the machine 1. More specifically, the pivot device comprises two main outer orifices, respectively O2 and O4 that are connected to the main enclosures 22 and 24. More specifically, the pivot device 3 has a connection interface IS, which cooperates with a receiving interface IM of the hydraulic machine. In this case, the pivot device 3 is partly engaged in a cavity of the part 4B of the casing of the machine, the bottom of this cavity forming the receiving interface IM. The pivot device 3 comprises ducts linking respectively the main outer orifices O2 and O4 to connection openings respectively OR2 and OR4 located in the connection interface IS.

More specifically, the pivot device comprises a casing 42 which has the main outer orifices O2 and O4, and a core 44 disposed in a cavity 41 of the casing 42. In this case, the core has the form of concentric tubes. It thus comprises an inner tube 46, which delimits a linking duct 45 and whose first end 46A located in the vicinity of the inner distributor 20 delimits the connection opening OR2, and whose opposite outer end 46B has an opening OR'2 that communicates with the outer orifice O2 through a drill 48 in the casing 42. The core 44 comprises a second tube 50 which surrounds the first tube 46 by arranging therewith an annular space 52 which puts in communication the outer orifice O4 with the connection opening OR4. Indeed, the annular space 52 opens at the first end 50A of the tube 50 close to the distributor on the opening OR4 and also opens at the opposite end 50B of the tube 50 on a part of the cavity 41 linked to the outer orifice O4 through a drill 54. The wall of the cavity 41 is stepped at the end of the tubes and cooperates with their ends by respective seals 47, 51 that allow fluidly isolating the communications between, on the one hand, the orifice O2 and the opening OR2 and, on the other hand, the orifice O4 and the opening OR4.

In this case, the casing 42 has an additional outer orifice OS linked to an additional opening ORS located in the connection interface IS. As best seen in FIG. 2, this opening ORS is linked to an annular space 56 arranged between the outer periphery of the tube 50 and the wall of the cavity 41 of the casing 42, this space being linked, on the one hand, to the additional outer orifice OS via a drill 58 in the casing 42 and, on the other hand, to a drain duct CM of the hydraulic machine.

The linking ducts formed through the interior 45 of the tube 46 and the annular spaces 52 and 56 form respective linking ducts between the outer orifices O2, O4 and OS and the connection openings OR2, OR4 and ORS. These ducts are concentric and parallel to the pivot axis P of the stator.

The main enclosures 22 and 24 have respective main openings, respectively 22A and 24A, which are located in the receiving interface IM. In this case, the main enclosures 22 and 24 are formed by grooves arranged between the outer periphery of the distributor 20 and the inner periphery of the distribution cover 4B and separated by seals j. The main openings 22A and 24A are formed at the ends, located in the receiving interface IM, of drills made in the distribution cover 4B and linking these openings to the aforementioned grooves. When the receiving IM and connection IS interfaces cooperate together, the main opening 22A is located opposite the connection opening OR2 and the main opening 24A is located opposite the connection opening OR4. Likewise, the connection opening ORS is then located opposite an opening CM' of the duct CM, this duct being produced by a drill made in the distribution cover 4B and aiming at linking the interior space of the casing of the hydraulic machine to the opening CM' and, through the link with the linking line 56, to the additional outer orifice OS, particularly to form a leakage return.

According to the disclosure, the pilot line used for the supply of the pilot chamber 29 or 129 is formed in the pivot device 3. More specifically, this device has an outer pilot orifice OP which is linked, by the pilot line 60, to a pilot opening 61 located in the connection interface IS. In this case, the pilot line 60 is formed in the wall of the casing 42 and the pilot opening 61 is located in a part of the outer surface of this casing which is located in the connection interface IS. In this case, this opening 61 is delimited in a groove of the outer wall and the part of the casing 42 which is engaged in the distribution cover, is located at a staging E of the cavity of this cover in which the pivot device is engaged. This groove which has the opening 61 is delimited between two joints 61', 61".

In this case, the pilot line 60 comprises an axial segment 60A, which is parallel to the pivot axis P of the stator and which, being formed from an outer face of the casing 42, is closed by a plug 60'A added at this face. This segment extends axially up to the aforementioned groove in which the opening 61 is located. However, the outer pilot orifice OP is formed in an outer face of the casing 42 of the pivot device which extends substantially axially, on a side face of this device. The pilot line 60 comprises a linking segment 60B linking the axial segment 60A to this face. In this case, a connector 60C is represented screwed into the opening OP, for connecting the pilot line with a fluid supply line. Such connectors can of course be provided for the outer orifices O2, O4 and OS.

For clarity of the drawing, the pilot line 60 is represented in the section plane of FIG. 2 which passes through the axis P of the pivot device and the axis of rotation A of the hydraulic machine. This is of course not necessarily the case. Particularly, the different orifices O2, O4, OP and OS when the latter is present, can be distributed over the face 42A of the casing 42 of the pivot device so as to allow easy fittings in a suitable space requirement.

The pilot chamber 29 or 129 has a pilot inlet EP located in the receiving interface IM. In this case, the pilot chamber is formed towards the bottom of the distribution cover 4B (opposite to the cylinder block 18 of the hydraulic machine), and is linked to this pilot inlet EP by a linking pilot line made in the distribution cover. For the convenience of machining, this linking pilot line can be formed by straight segments. Thus, the linking pilot line 64 represented in FIG. 2 comprises a first segment 64A which links the pilot chamber 29 to an outer surface of the distribution cover 4B at which it is closed off by a plug 64'A, and a second segment 64B which links the segment 64A to the pilot inlet EP, which is located in a shoulder portion of the wall of the cavity of the distribution cover forming the receiving interface. Thus, the linking pilot line 64 is arranged in the stator of the hydraulic machine. The linking pilot line 164 in FIG. 3 comprises the rectilinear segments 164A, 164B and 164C whose ends located at the outer surface of the distribution cover 104B are closed by plugs.

According to the present disclosure, the outer orifices O2, O4 and OP as well as OS, if the latter is present, are grouped together in the same face of the casing 42 of the pivot device, this face being easily accessible for the piping and protected with respect to the pivoting movements of the hydraulic machine.

Figure 4:
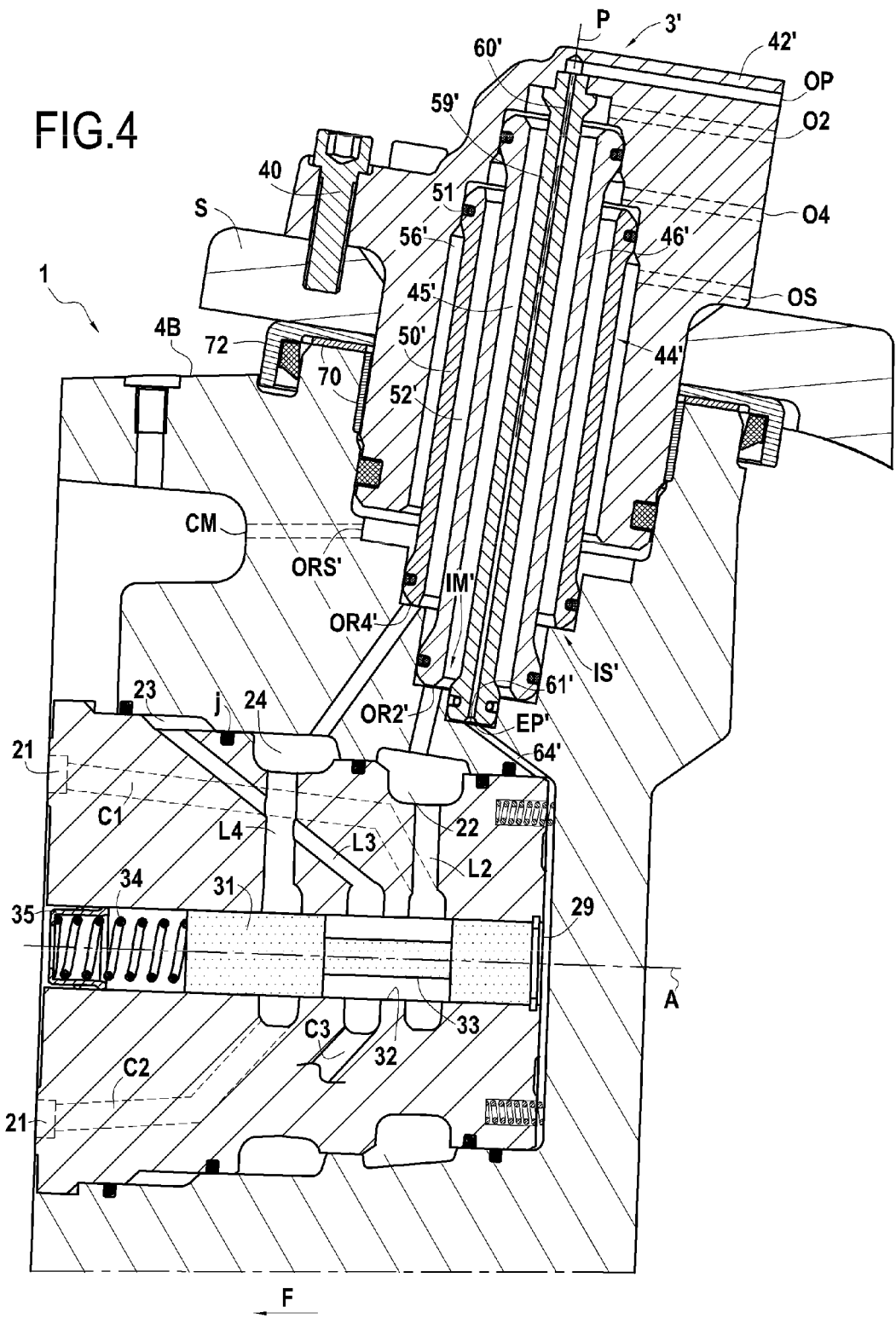
FIG. 4 is a view similar to FIG. 2 showing another variant.

In FIGS. 1 to 3, the pilot line 60 is formed in the wall of the casing 42. In so far as a large fluid flow rate is not necessary to pilot the displacement selector 30, the section of the pilot line may be small, which is compatible with this type of drill. However, it is possible to choose to produce the pilot line in a different way, for example by adding a third tube concentric with the tubes 46 and 50 to form the core of the pivot device 3. Thus, in FIG. 4, the core 44' of the pivot device 3' comprises a first tube 46' and a second tube 50' that are similar to the tubes 46 and 50, as well as a third tube 59', which is concentric with the tubes 46' and 50', by being in this case disposed inside the tube 46'. The annular spaces 45' and 52', located between the tubes 46' and 59' and between the tubes 50' and 46', respectively, form respective linking ducts between the main outer orifice O2, respectively O4, and the opening OR2', respectively OR4', located in the connection interface IS'. The annular space 56' between the tube 50' and the wall of the casing 42' forms a linking duct between the outer orifice OS and the additional opening ORS' towards a drain line CM. The openings OR2' and OR4' are linked to the main enclosures 22 and 24 as in FIG. 2. The inner channel 60' of the tube 59' forms a pilot line which extends between the outer pilot orifice OP and the pilot opening 61' located in the interface IS'. This pilot line 60' communicates, via the pilot inlet EP' located in the receiving interface IM', with the linking pilot line 64' linked to the pilot chamber 29. Of course, among the components of the core 44', the tube which is used to define the pilot line may be the innermost tube, as represented, or one of the other tubes of the arrangement of concentric tubes.

The pivot device 3 forms a rotating joint which is fixed relative to the support S, forms the pivot axis P and establishes the hydraulic connections necessary not only for the operation of the hydraulic machine, but also for the selection of its displacement.

In this case, the pivot device projects, at the connection interface, inside the stator of the hydraulic machine, by entering a cavity of this stator. An inverse dispersion can of course be imagined.

The groove in which the pilot opening 61 is located, as well as the grooves in which the openings OR2, OR4 and ORS are located extend over an angular range allowing communication with, respectively, the openings EP, 22A, 22B and CM4 located in the receiving interface IM over the entire pivoting amplitude of the hydraulic machine about the pivot axis P. These grooves may be annular.

The stator is guided in its pivoting relative to the pivot device by anti-friction cushions 70 also forming a bearing, and retained by a ring 70.

The ducts 48, 58, 54, 58, 64A and 64B are presented as being produced by drilling. Of course, this is just an example. These ducts can also derive from foundry/molding. In addition, the duct 54 A may have a part passing through the distributor 20, in the case where the pilot chamber 29 or 129 is entirely housed in the distributor.

The invention claimed is:

1. A hydraulic arrangement for a steered wheel of a vehicle, comprising:
    a hydraulic machine comprising a rotor part configured to be connected to the steered wheel, a stator having two main enclosures having respective main openings located in a receiving interface, a set of pistons sliding in cylinders to drive in rotation the rotor part, a fluid distributor configured to establish selective links between the main enclosures and the cylinders, and a hydraulic component requiring hydraulic piloting between at least two positions having an influence on an operating mode of the hydraulic machine, the stator comprising a machine casing of the hydraulic machine, the cylinders and the fluid distributor being arranged in the machine casing,
    a pivot device which defines a pivot axis of the stator, the pivot device comprising two main outer orifices linked to respective connection openings located in a connection interface and configured to be fixed to a support while being engaged in a part of the machine casing and being linked to the stator of the hydraulic machine so that the receiving interface and the connection interface cooperate by linking the respective main openings and the respective connection openings, and
    a pilot line linked to a pilot chamber of the hydraulic component, the pilot chamber having a pilot inlet located in the receiving interface, the pilot line being formed in the pivot device and extending between an outer pilot orifice present in the pivot device and a pilot opening located in the connection interface, the pilot opening being linked to the pilot inlet by the cooperation of the connection interface and the receiving interface.

2. The arrangement according to claim 1, wherein the hydraulic component is configured to be controlled via the pilot chamber between the at least two different positions causing the links established by the fluid distributor to differ.

3. The arrangement according to claim 2, wherein the hydraulic component comprises a spool movable in a bore of the fluid distributor, with which the pilot chamber communicates, the spool being configured to be moved in a first direction when the pressure in the pilot chamber increases against a return means, urging the spool in the opposite direction.

4. The arrangement according to claim 3, wherein the spool is movable in the bore along an axis of translation which coincides with an axis of rotation of the rotor part of the hydraulic machine.

5. The arrangement according to claim 2, wherein the hydraulic component comprises a spool movable in a bore of a part of the machine casing of the hydraulic machine, the pilot chamber communicates with the bore, and the spool is configured to be moved in a first direction when the pressure in the pilot chamber increases against a return means, urging the spool in the opposite direction.

6. The arrangement according to claim 1, wherein the pivot device comprises a pivot casing that includes the main outer orifices, the outer pilot orifice, and a core disposed in the pivot casing, the pivot casing and the core cooperating to define respective linking ducts between the main outer orifices and the connection openings.

7. The arrangement according to claim 6, wherein the pilot line is formed in the wall of the pivot casing and the pilot opening is located in a surface of said pivot casing in the connection interface.

8. The arrangement according to claim 6, wherein the pilot line is formed in a part of the core.

9. The arrangement according to claim 1, wherein the pilot opening is located in a groove, said groove extending along at least one ring portion and being located in the connection interface.

10. The arrangement according to claim 9, wherein the pilot inlet is located in a stepped portion of the receiving interface.

11. The arrangement according to claim 1, wherein the pilot chamber is linked to the pilot inlet by a linking pilot line arranged in the stator.

12. The arrangement according to claim 1, wherein the pilot line comprises an axial segment substantially parallel to the pivot axis of the stator.

13. The arrangement according to claim 12, wherein said axial segment is formed by a drilled hole plugged at an end thereof opposite to the connection interface by an added plug.

14. The arrangement according to claim 1, wherein the pivot device comprises at least one additional outer orifice linked to an additional opening located in the connection interface to be connected to an additional opening of the hydraulic machine located in the receiving interface.

15. The arrangement according to claim 1, wherein the hydraulic machine is a radial-piston and multilobe cam hydraulic machine.

16. The arrangement according to claim 1, wherein the part of the machine casing in which the pivot device is engaged forms a distribution cover at least partially surrounding the fluid distributor and the main enclosures are formed between the distribution cover and the fluid distributor.

17. A hydraulic arrangement for a steered wheel of a vehicle, comprising:
    a hydraulic machine comprising a rotor part configured to be connected to the steered wheel, a stator having two main enclosures having respective main openings located in a receiving interface, a set of pistons sliding in cylinders to drive in rotation the rotor part, and a fluid distributor configured to establish selective links between the main enclosures and the cylinders,
    a pivot device which defines a pivot axis of the stator, the pivot device comprising two main outer orifices linked to respective connection openings located in a connection interface and configured to be fixed to a support while being linked to the stator of the hydraulic machine so that the receiving interface and the connection interface cooperate by linking the respective main openings and the respective connection openings, and
    a pilot line linked to a pilot chamber, the pilot chamber having a pilot inlet located in the receiving interface, the pilot line being formed in the pivot device and extending between an outer pilot orifice present in the pivot device and a pilot opening located in the connection interface, the pilot opening being linked to the pilot inlet by the cooperation of the connection interface and the receiving interface, wherein the pivot device comprises a pivot casing that includes the main outer orifices, the outer pilot orifice, and a core disposed in the pivot casing, the pivot casing and the core cooperating to define respective linking ducts between the main outer orifices and the connection openings, and wherein the pilot line is formed in the wall of the pivot casing and the pilot opening is located in a surface of said pivot casing in the connection interface.

18. The arrangement according to claim 17, wherein the stator comprises a machine casing of the hydraulic machine, the cylinders and the fluid distributor being arranged in the machine casing, and the pivot device being engaged in a part of the machine casing.

19. The arrangement according to claim 18, wherein the part of the machine casing in which the pivot device is engaged forms a distribution cover at least partially surrounding the fluid distributor and the main enclosures are formed between the distribution cover and the fluid distributor.

20. A hydraulic arrangement for a steered wheel of a vehicle, comprising:

a hydraulic machine comprising a rotor part configured to be connected to the steered wheel, a stator having two main enclosures having respective main openings located in a receiving interface, a set of pistons sliding in cylinders to drive in rotation the rotor part, and a fluid distributor configured to establish selective links between the main enclosures and the cylinders, a pivot device which defines a pivot axis of the stator, the pivot device comprising two main outer orifices linked to respective connection openings located in a connection interface and configured to be fixed to a support while being linked to the stator of the hydraulic machine so that the receiving interface and the connection interface cooperate by linking the respective main openings and the respective connection openings, and a pilot line linked to a pilot chamber, the pilot chamber having a pilot inlet located in the receiving interface, the pilot line being formed in the pivot device and extending between an outer pilot orifice present in the pivot device and a pilot opening located in the connection interface, the pilot opening being linked to the pilot inlet by the cooperation of the connection interface and the receiving interface, wherein the pivot device comprises a pivot casing that includes the main outer orifices, the outer pilot orifice, and a core disposed in the pivot casing, the pivot casing and the core cooperating to define respective linking ducts between the main outer orifices and the connection openings, the core comprising a set of concentric tubes and the linking ducts comprising at least one linking duct formed between the tubes, the pilot line being provided inside an innermost tube of the set of concentric tubes.

21. The arrangement according to claim 20, wherein the stator comprises a machine casing of the hydraulic machine, the cylinders and the fluid distributor being arranged in the machine casing, and the pivot device being engaged in a part of the machine casing.

22. The arrangement according to claim 21, wherein the part of the machine casing in which the pivot device is engaged forms a distribution cover at least partially surrounding the fluid distributor and the main enclosures are formed between the distribution cover and the fluid distributor.

\* \* \* \* \*